US012770898B2

(12) United States Patent
Oh et al.

(10) Patent No.: US 12,770,898 B2
(45) Date of Patent: Oct. 20, 2026

(54) FUEL CELL MEMBRANE HUMIDIFIER

(71) Applicant: KOLON INDUSTRIES, INC., Seoul (KR)

(72) Inventors: Young Seok Oh, Seoul (KR); Ah Reum Lee, Seoul (KR); Ji Yoon Lee, Seoul (KR); Kyoung Ju Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 521 days.

(21) Appl. No.: 18/263,925

(22) PCT Filed: Mar. 8, 2022

(86) PCT No.: PCT/KR2022/003311
§ 371 (c)(1),
(2) Date: Aug. 2, 2023

(87) PCT Pub. No.: WO2022/191610
PCT Pub. Date: Sep. 15, 2022

(65) Prior Publication Data

US 2024/0304838 A1 Sep. 12, 2024

(30) Foreign Application Priority Data

Mar. 11, 2021 (KR) ........................ 10-2021-0031933

(51) Int. Cl.
*H01M 8/04119* (2016.01)
*H01M 8/04089* (2016.01)

(52) U.S. Cl.
CPC ... *H01M 8/04149* (2013.01); *H01M 8/04104* (2013.01); *H01M 8/04141* (2013.01)

(58) Field of Classification Search
None
See application file for complete search history.

(56) References Cited

U.S. PATENT DOCUMENTS

| | | | |
|---|---|---|---|
| 11,219,865 | B2 | 1/2022 | Takeuchi |
| 2016/0322654 | A1 | 11/2016 | Koo |
| 2021/0151780 | A1 | 5/2021 | Kim |

FOREIGN PATENT DOCUMENTS

| | | | |
|---|---|---|---|
| CA | 3 202 193 | | 6/2023 |
| CA | 3 202 702 | A1 | 12/2023 |

(Continued)

OTHER PUBLICATIONS

KR2019-0138288A (translation (Year: 2019).*

(Continued)

*Primary Examiner* — Tracy M Dove
(74) *Attorney, Agent, or Firm* — Harvest IP Law, LLP

(57) ABSTRACT

The present invention relates to a fuel cell membrane humidifier capable of preventing a decrease in humidification efficiency, caused by a pressure difference between the inside and outside of the membrane humidifier. The fuel cell membrane humidifier according to an embodiment of the present invention comprises: a middle case which has a module insertion unit; a cap case; a hollow fiber membrane module which is inserted into the module insertion unit; and an active pressure buffer unit which is formed between the middle case and the module insertion unit and which, according to the output condition of a fuel cell, prevents expansion of the module insertion unit due to the pressure difference between the inside and outside of the middle case or eliminates the pressure difference.

3 Claims, 10 Drawing Sheets

(56) References Cited

FOREIGN PATENT DOCUMENTS

| | | | |
|---|---|---|---|
| CN | 105322201 | A | 2/2016 |
| CN | 110545902 | A | 12/2019 |
| CN | 112236890 | A | 1/2021 |
| EP | 3 312 923 | A1 | 4/2018 |
| EP | 4 235 879 | A1 | 8/2023 |
| EP | 4 266 435 | A1 | 10/2023 |
| EP | 4 280 319 | A1 | 11/2023 |
| EP | 4 350 820 | A1 | 4/2024 |
| JP | 5012109 | B2 | 11/2007 |
| JP | 2010265957 | A | 11/2010 |
| KR | 10-1393558 | B1 | 5/2014 |
| KR | 2015-0078541 | A | 7/2015 |
| KR | 2018-0037390 | A | 4/2018 |
| KR | 2019-0055635 | A | 5/2019 |
| KR | 20190138288 | A | 12/2019 |
| KR | 20210011204 | A | 2/2021 |
| WO | 2021/107679 | A | 6/2021 |
| WO | 2022/169351 | A | 8/2022 |

OTHER PUBLICATIONS

Office Action from Canadian Office Action, dated Nov. 4, 2024.
Office Action from Japanese Office Action, dated Sep. 25, 2024.
Notice of Allowance dated May 12, 2025.
European Search Report, dated Oct. 24, 2024.
CN Office Action dated Mar. 26, 2026.

* cited by examiner

Prior Art

Prior Art

Prior Art

Prior Art

FUEL CELL MEMBRANE HUMIDIFIER

CROSS REFERENCE TO RELATED APPLICATION(S)

This application is a National Stage of International Application No. PCT/KR2022/003311 filed on Mar. 8, 2022, claiming priority based on Korean Patent Application No. 10-2021-0031933 filed on Mar. 11, 2021, the disclosure of which is incorporated herein by reference in their entirety.

TECHNICAL FIELD

The present invention relates to a fuel cell membrane humidifier, and more particularly, to a fuel cell membrane humidifier capable of preventing humidification efficiency from being degraded due to a pressure difference between the inside and the outside of a membrane humidifier.

BACKGROUND ART

Fuel cells are power generation cells that produce electricity through coupling between hydrogen and oxygen. The fuel cells have an advantage of being able to continuously produce electricity as long as the hydrogen and the oxygen are supplied, and having an efficiency that is about twice higher than an internal combustion engine because of no heat loss, unlike general chemical cells such as dry batteries or storage batteries.

Further, since chemical energy generated through coupling between the hydrogen and the oxygen is directly converted into electrical energy, emission of pollutants is reduced. Therefore, the fuel cells have an advantage of being environmentally friendly and being able to reduce concerns about resource depletion due to increased energy consumption.

These fuel cells are roughly classified into, for example, a polymer electrolyte membrane fuel cell (PEMFC), a phosphoric acid fuel cell (PAFC), a molten carbonate fuel cell (MCFC), a solid oxide fuel cell (SOFC), and an alkaline fuel cell (AFC) depending on a type of electrolyte used.

These fuel cells fundamentally operate according to the same principle, but have a difference in a type of fuel used, an operating temperature, a catalyst, an electrolyte, or the like. Among the cells, the polymer electrolyte membrane fuel cell is known to be the most promising not only for small-scale stationary power generation equipment but also for transportation systems because the polymer electrolyte membrane fuel cell operates at a lower temperature than other fuel cells and can be miniaturized due to a high output density.

One of the most important factors in improving the performance of the polymer electrolyte membrane fuel cell (PEMFC) is to maintain moisture content by supplying a certain amount or more of moisture to a polymer electrolyte membrane (or proton exchange membrane: PEM) of a membrane electrode assembly (MEA). This is because the efficiency of power generation is rapidly degraded when the polymer electrolyte membrane is dried.

Examples of a method for humidifying the polymer electrolyte membrane include 1) a bubbler humidification scheme for filling a pressure-resistant container with water and then passing a target gas through a diffuser to supply moisture, 2) a direct injection scheme for calculating a moisture supply amount required for a fuel cell reaction and directly supplying moisture to a gas flow pipe through a solenoid valve, and 3) a humidification membrane scheme for supplying moisture to a fluidized gas layer using a polymer separation membrane.

Among these, the humidification membrane scheme for humidifying a polymer electrolyte membrane by providing water vapor to a gas supplied to the polymer electrolyte membrane using a membrane that selectively permeates only water vapor contained in an off-gas is advantageous in that a weight and size of a humidifier can be reduced.

A selective permeable membrane used in the humidification membrane scheme is preferably a hollow fiber membrane having a large permeable area per unit volume when a module is formed. That is, when a membrane humidifier is manufactured using hollow fiber membranes, there are advantages that high integration of the hollow fiber membranes with a large contact surface area is possible so that a fuel cell can be sufficiently humidified even with a small capacity, low-cost materials can be used, and moisture and heat contained in an unreacted gas discharged with a high temperature from the fuel cell can be recovered and can be reused through the humidifier.

Meanwhile, when the membrane humidifier operates, there is a problem in that humidification efficiency is degraded due to a pressure difference between the inside and the outside of the membrane humidifier. This will be described with reference to FIG. 1, FIG. 2, and FIG. 3.

FIG. 1, FIG. 2, and FIG. 3 are cross-sectional views of a fuel cell membrane humidifier according to the related art. For convenience of description, only hollow fiber membranes in a portion of a potting portion P are illustrated in the drawing, and illustration of hollow fiber membranes of other portions are omitted. In the membrane humidifier of the related art, a hollow fiber membrane module 11 in which a plurality of hollow fiber membranes are accommodated is accommodated inside a middle case 10. As illustrated, the hollow fiber membrane module 11 may be formed in the form of a cartridge. A module insertion portion 12 into which the hollow fiber membrane module 11 in the form of a cartridge is inserted is formed inside the middle case 10. The module insertion portion 12 is formed of a plurality of partition walls **12*a* and 12*b* formed inside the middle case 10. Here, the partition wall 12*b* forming an outer shell of the module insertion portion 12 is substantially a portion of an inner wall of the middle case 10**.

As illustrated in FIG. 2, the hollow fiber membrane module 11 is inserted into the module insertion portion 12 by both sides of the hollow fiber membrane module 11 being put into the partition walls **12*a* and 12*b*. In this case, the middle case 10 includes a central recessed portion 10*a* of which a central portion is recessed, and an inner wall of the central recessed portion 10*a* and the hollow fiber membrane module 11 are tightly adhered to each other. As a result, two fluid flow spaces A and B formed by a non-recessed portion 10*b* of the middle case 10 and the hollow fiber membrane module 11 are isolated from each other. The central recessed portion 10*a* and the partition wall 12*b* forming the outer shell of the module insertion portion 12** are substantially the same.

Meanwhile, a second fluid discharged from a fuel cell stack (not illustrated) flows into the inside through a fluid inlet (not illustrated) formed in the middle case 10 and flows through the hollow fiber membrane module 11 performs moisture exchange with a first fluid supplied from a blower and flowing inside the hollow fiber membranes. A cap case 20 is coupled to the middle case 10, and a fluid inlet **20*a* through which the first fluid flows into/from the inside is formed in the cap case 20**.

However, in the case of a high-pressure operating condition, that is, when the second fluid flowing into the inside from the fluid inlet (not illustrated) formed in the middle case 10 is a high-pressure fluid having a higher pressure than atmosphere outside the membrane humidifier, a pressure difference occurs between the inside and the outside of the membrane humidifier and the pressure of the second fluid flowing inside the membrane humidifier is higher than external atmospheric pressure, and thus, a pressure gradient is formed toward the outside of the membrane humidifier and a portion of the membrane humidifier (specifically, a recessed portion of the middle case) is deformed in a direction outside the membrane humidifier, as illustrated in FIG. 3. On the other hand, since the internal partition 12*a* has the same pressure on both sides of the partition, a pressure gradient is not formed and deformation does not occur.

Change in a shape of the middle case 10 due to the pressure gradient creates a gap between the hollow fiber membrane module 11 and the inner wall of the middle case 10, and the second fluid in a fluid flow space A flows into a fluid flow space B through this gap instead of flowing through the hollow fiber membrane module 11. The second fluid that does not flow through the hollow fiber membrane module 11 is a fluid that has not been humidified through the hollow fiber membranes, which causes a problem in that the humidification efficiency is degraded.

FIG. 4 is a diagram illustrating another fuel cell membrane humidifier (see Korean Unexamined Patent Publication No. 2019-0138288) according to the related art for solving the problems of the fuel cell membrane humidifier of the related art illustrated in FIG. 1.

As illustrated in FIG. 4, in another fuel cell membrane humidifier of the related art, a module insertion portion 12 and a pressure buffer portion 22 are formed inside a middle case 10. The pressure buffer portion 22 includes a space formed by an outer partition wall 12*b* and the middle case 10 spaced apart from each other, and a connection portion 21 formed between the outer partition wall 12*b* and the middle case 10. The connection portion 21 isolates a fluid flow space A from a fluid flow space B so that a fluid flowing into the inside through a fluid passage 20*a* flows only through a hollow fiber membrane cartridge C.

The pressure buffer portion 22 configured as described above makes pressure on both sides of the outer partition wall 12*b* substantially the same. Since a pressure gradient is not formed on both the sides of the outer partition wall 12*b* due to the pressure buffer portion 22, the outer partition wall 12*b* is not deformed. Therefore, a gap is not created between the hollow fiber membrane cartridge C and the outer partition wall 12*b*, unlike the fuel cell membrane humidifier illustrated in FIG. 1, making it possible to prevent the fluid in the fluid flow space A from flowing through the fluid flow space B instead of flowing through the hollow fiber membrane module, and as a result, to prevent the humidification efficiency from being degraded.

Meanwhile, in the fuel cell membrane humidifier according to the related art as illustrated in FIG. 4, when pressure (internal pressure P1) of the second fluid flowing into the inside from a fluid inlet (not illustrated) formed in the middle case 10 is much higher than atmospheric pressure (external pressure P2) outside the membrane humidifier (P1>>P2) due to a high output situation or an abnormal output situation of a fuel cell, the middle case 10 may receive an outward pressure and expand outward (indicated by E1) due to a pressure difference, as illustrated in FIG. 5A and FIG. 5B. In this case, since the outer partition wall 12*b* is connected to the connection portion 21, the outer partition wall 12*b* may also expand outward (indicated by E2). When the outer partition wall 12*b* expands outward, a gap may be created between the hollow fiber membrane cartridge C and the outer partition wall 12*b*. Therefore, the second fluid that does not flow through the hollow fiber membrane module 11 is generated, which causes a problem in that the humidification efficiency is degraded.

DISCLOSURE

Technical Problem

An object of the present invention is to provide a fuel cell membrane humidifier capable of preventing the humidification efficiency from being degraded due to a pressure difference between the inside and the outside of the membrane humidifier.

Technical Solution

A fuel cell membrane humidifier according to an embodiment of the present invention includes a middle case having a module insertion portion formed therein, the module insertion portion including an outer partition wall formed to be spaced apart from an inner wall of a middle case, a second fluid inlet through which a second fluid is supplied, and a second fluid outlet through which the second fluid is discharged; a cap case coupled to the middle case and having a first fluid inlet through which a first fluid flows into the inside and a first fluid outlet through which the first fluid is discharged; a hollow fiber membrane module inserted into the module insertion portion and including at least one hollow fiber membrane bundle having a plurality of hollow fiber membranes integrated therein or at least one hollow fiber membrane cartridge having a plurality of hollow fiber membranes accommodated therein; and an active pressure buffer portion formed between the middle case and the module insertion portion to prevent the module insertion portion from expanding due to a pressure difference between the inside and the outside of the middle case or eliminate a pressure difference, depending on an output situation of a fuel cell.

In the fuel cell membrane humidifier according to the embodiment of the present invention, the active pressure buffer portion may include a bypass structure formed between the outer partition wall and the inner wall of the middle case.

In the fuel cell membrane humidifier according to the embodiment of the present invention, the bypass structure may include a connection member formed to be fixed to the outer partition wall, protrude in a direction of the middle case, and be spaced apart from the inner wall of the middle case; and a blocking member formed on the inner wall of the middle case, protruding in a direction of the outer partition wall, and coupled to the connection member in a sliding manner.

In the fuel cell membrane humidifier according to the embodiment of the present invention, the blocking member may include bypass holes, the bypass holes being able to be opened or closed depending on a magnitude of expansion pressure between the outer partition wall and the middle case.

In the fuel cell membrane humidifier according to the embodiment of the present invention, when the expansion pressure gradually increases, the blocking member may expand outward along with the middle case, and the bypass holes are opened.

In the fuel cell membrane humidifier according to the embodiment of the present invention, a first sliding protrusion protruding in a direction of the blocking member is formed at an end of the connection member on the middle case side.

In the fuel cell membrane humidifier according to the embodiment of the present invention, a second sliding protrusion protruding in a direction of the connection member is formed at an end of the blocking member on the outer partition wall side.

Other specific matters of implementation examples according to various aspects of the present invention are included in the detailed description below.

Advantageous Effects

According to an embodiment of the present invention, it is possible to prevent the humidification efficiency from being degraded due to a pressure difference between the inside and the outside of the membrane humidifier. Further, it is possible to prevent a gap from being created between a hollow fiber membrane cartridge and an outer partition or eliminate a difference in pressure even in a high output situation or an abnormal output situation of a fuel cell to prevent the humidification efficiency from being degraded.

MODE FOR DISCLOSURE

Since various changes may be made to the present invention, which may have several embodiments, specific embodiments will be illustrated and described in detail herein. However, it will be understood that this is not intended to limit the present invention to the specific embodiments, and all changes, equivalents, or substitutions included in the spirit and scope of the present invention are included.

The terms used herein are used for the purpose of describing specific embodiments only and are not intended to limit the present invention. The singular expressions “a,” “an” and “the” include the plural expressions, unless the context clearly indicates otherwise. It will be understood that the terms “include” or “have” herein specify the presence of features, numbers, steps, operations, components, parts or combinations thereof described herein, but do not preclude the presence or addition of one or more other features, numbers, steps, operations, components, parts or combinations thereof. Hereinafter, a gasket assembly and a fuel cell membrane humidifier including the same according to embodiments of the present invention will be described with reference to the drawings.

FIG. 6, FIG. 7, FIG. 8, and FIG. 9 are views illustrating various types of fuel cell membrane humidifiers according to an embodiment of the present invention. As illustrated in FIG. 6, FIG. 7, FIG. 8, and FIG. 9, the fuel cell membrane humidifier (hereinafter also referred to as a ‘membrane humidifier’) according to the embodiment of the present invention includes a middle case 110 and a cap case 120.

Figure 6:
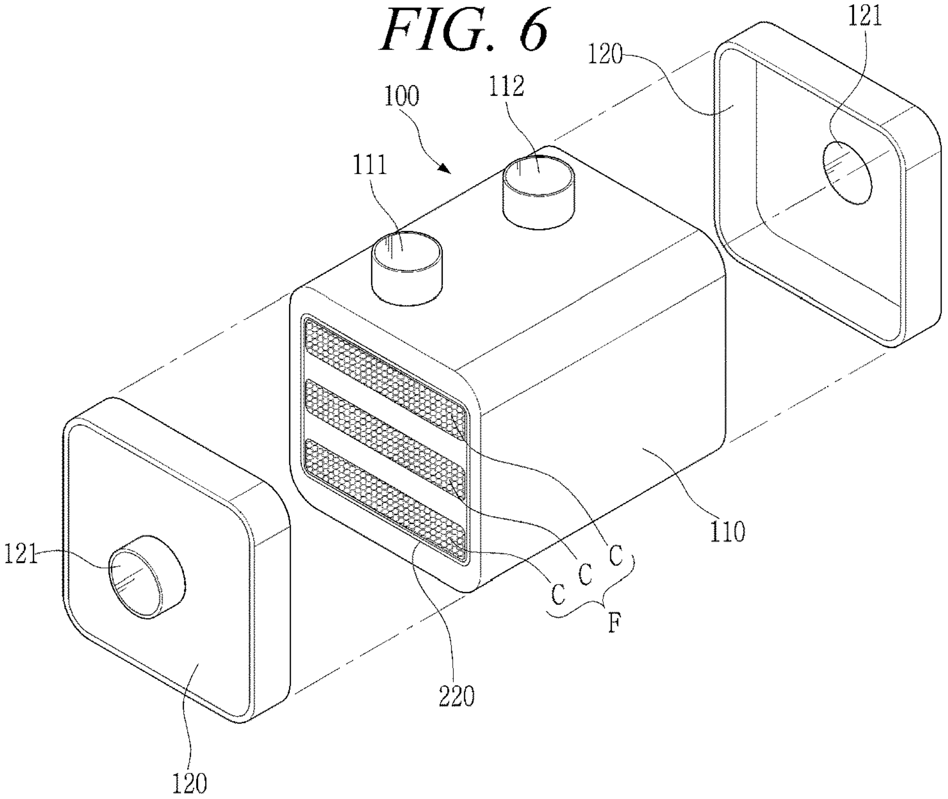
FIG. 6, FIG. 7, FIG. 8, and FIG. 9 are views illustrating various types of fuel cell membrane humidifiers according to an embodiment of the present invention.
Figure 7:
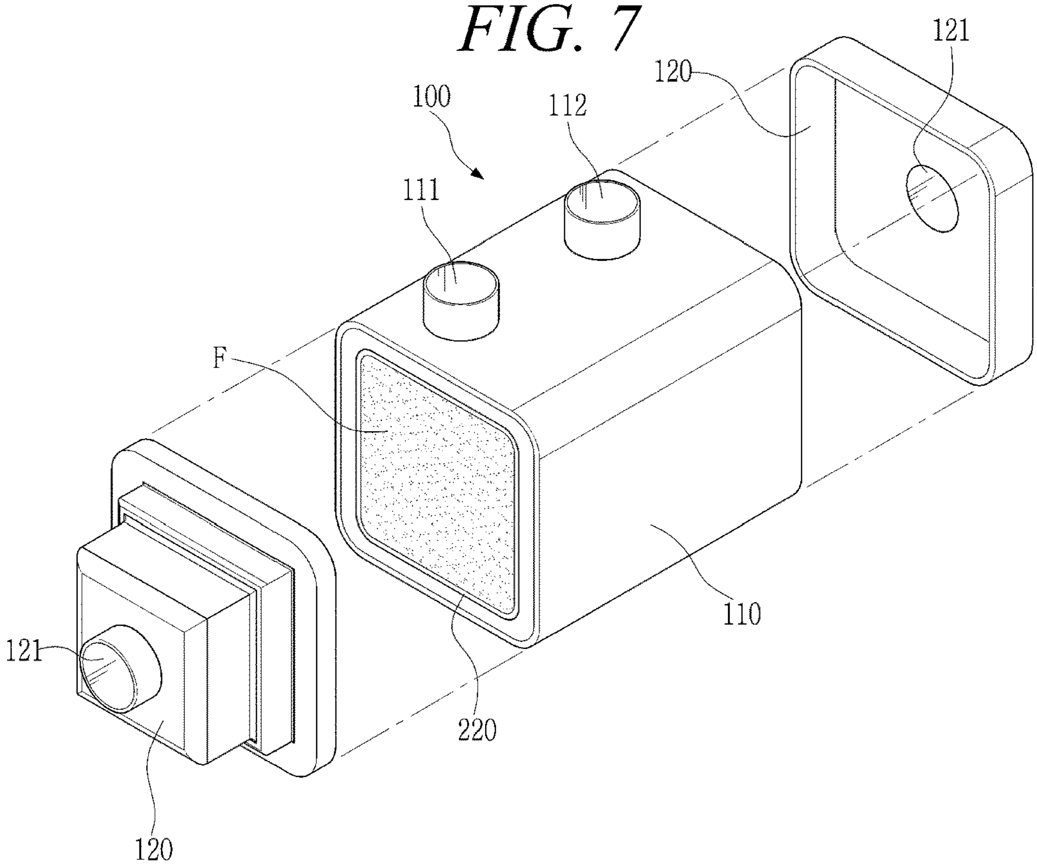
Figure 8:
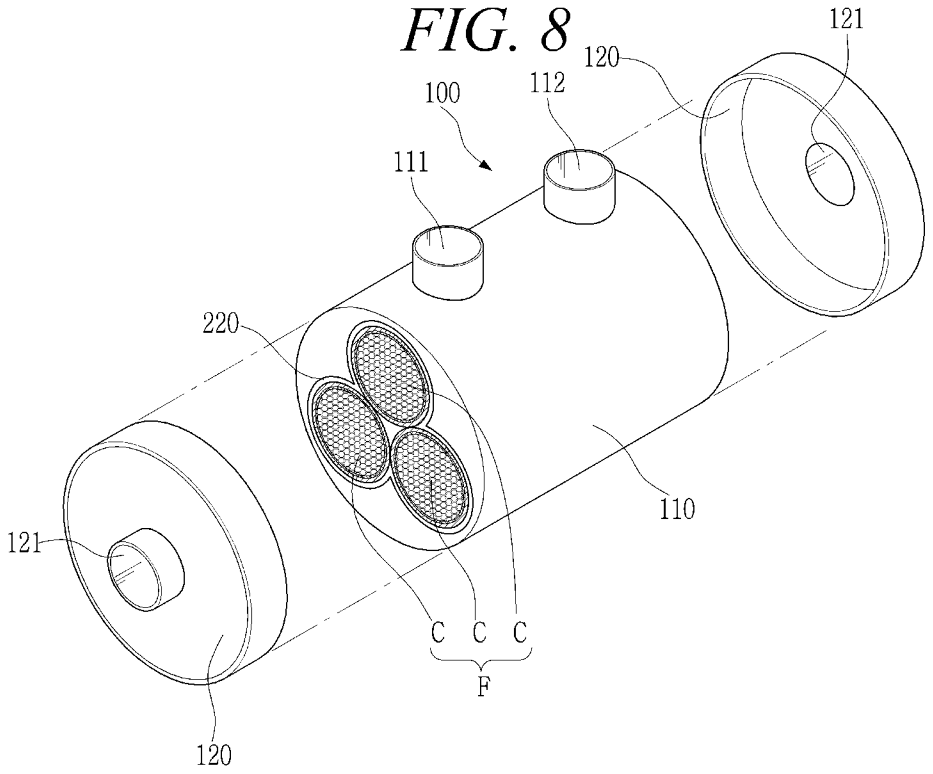
Figure 9:
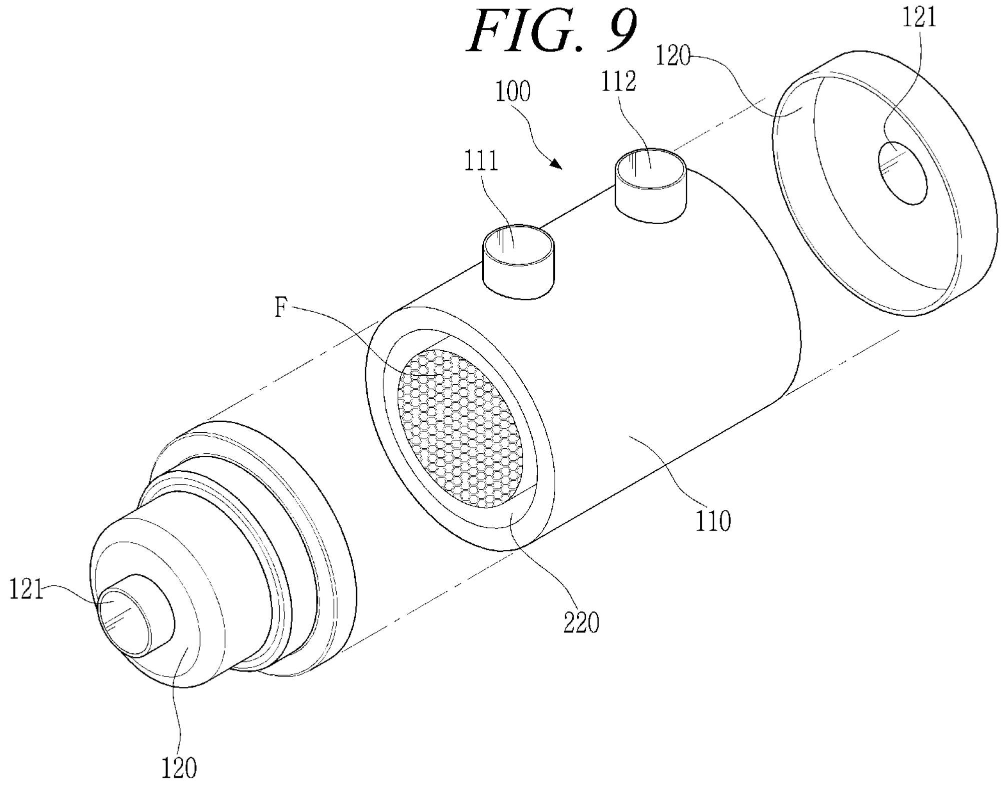

The middle case 110 is combined with the cap case 120 to form an outer shape of the membrane humidifier. The middle case 110 and the cap case 120 may be made of hard plastic such as polycarbonate or metal. The middle case 110 and the cap case 120 may have a polygonal cross-sectional shape in a width direction, as illustrated in FIGS. 6 and 7. The polygon may be a quadrangle, a square, a trapezoid, a parallelogram, a pentagon, a hexagon, or the like, and the polygon may have a shape with rounded corners. Alternatively, the cross-sectional shape in the width direction may be a circular shape, as illustrated in FIGS. 8 and 9. The circular shape may be an elliptical shape. FIG. 6, FIG. 7, FIG. 8, and FIG. 9 illustrate only examples of the shape of the membrane humidifier, but the present invention is not limited thereto.

In the middle case 110, a second fluid inlet 111 through which the second fluid is supplied, and a second fluid outlet 112 through which the second fluid is discharged are formed, and a hollow fiber membrane module F in which a plurality of hollow fiber membranes are accommodated is disposed inside the middle case 110. Depending on a design, reference sign 111 may denote the second fluid outlet through which the second fluid is discharged, and reference sign 112 may denote a second fluid inlet through which the second fluid is supplied. That is, one of reference signs 111 and 112 may denote the second fluid inlet, and the other may denote the second fluid outlet. In the following description, an example in which reference sign 111 denotes the second fluid inlet and reference sign 112 denotes the second fluid outlet will be described, but the present invention is not limited thereto.

The hollow fiber membrane module F may be a hollow fiber membrane bundle in which a plurality of hollow fiber membranes are integrated as illustrated in FIGS. 7 and 9, or may be hollow fiber membrane cartridges in which hollow fiber membranes or hollow fiber membrane bundles are accommodated as illustrated in FIGS. 6 and 8. A case in which a plurality of hollow fiber membrane cartridges form the hollow fiber membrane module F is illustrated in FIGS. 6 and 8, the present invention is not limited thereto, and the hollow fiber membrane module F may be formed of one hollow fiber membrane cartridge. In the following description, an example in which the hollow fiber membrane module F is formed of a plurality of cartridges C illustrated in FIG. 6, and a membrane humidifier has a polygonal cross-sectional shape in a width direction will be described, but substantially the same can apply to a membrane humidifier in FIGS. 7 to 9. Further, a case in which a shape of the cartridge C also has a circular or rectangular cross section is illustrated, but the shape of the cartridge C is not limited thereto.

Figure 1:
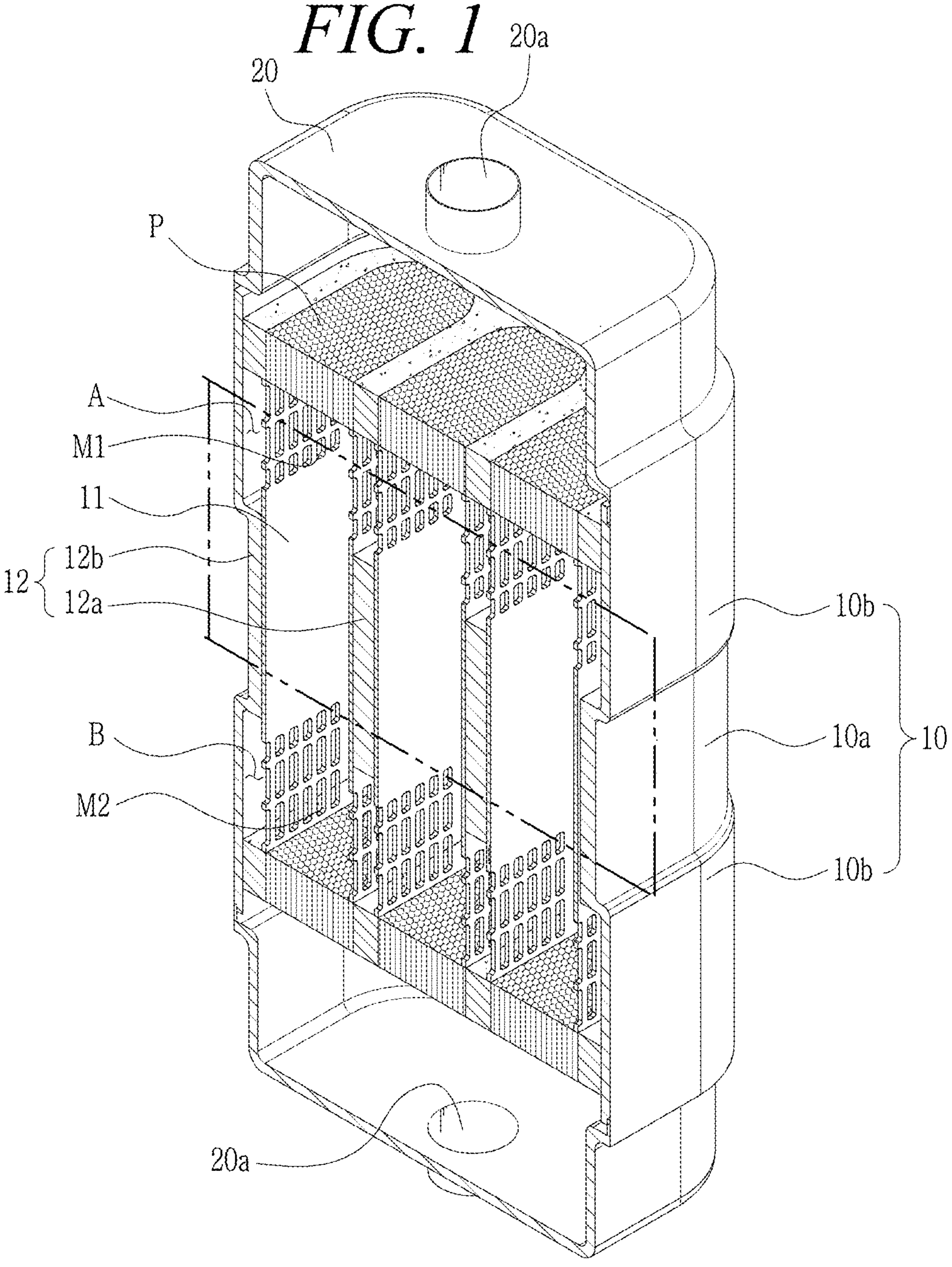
FIG. 1, FIG. 2, and FIG. 3 are views illustrating problems of a fuel cell membrane humidifier according to the related art.
Figure 2:
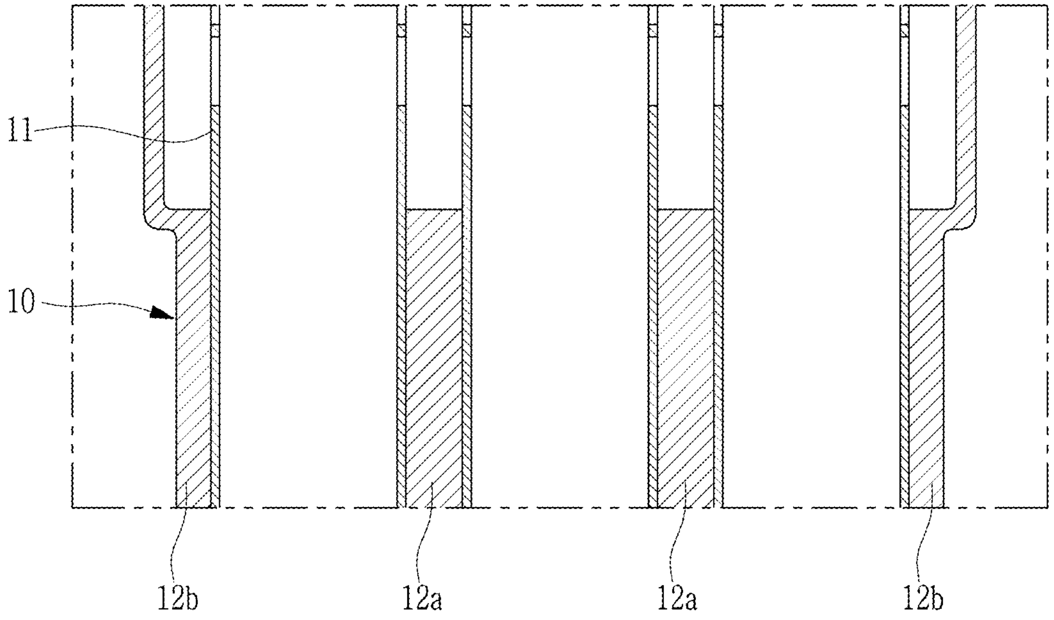
Figure 3:
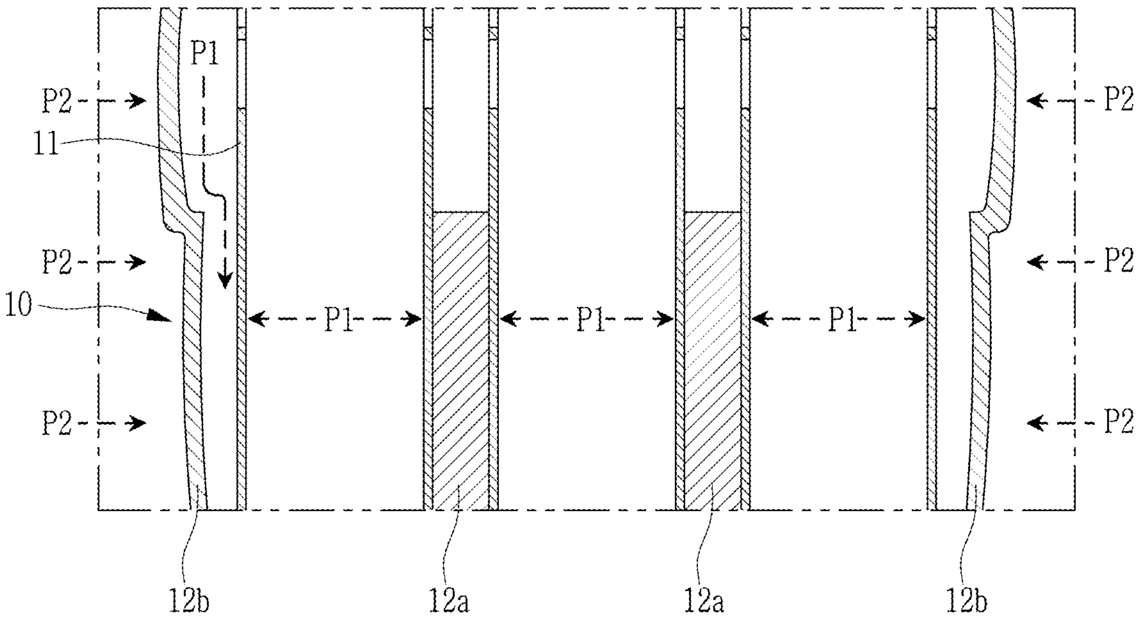
Prior Art FIG. 3
Figure 4:
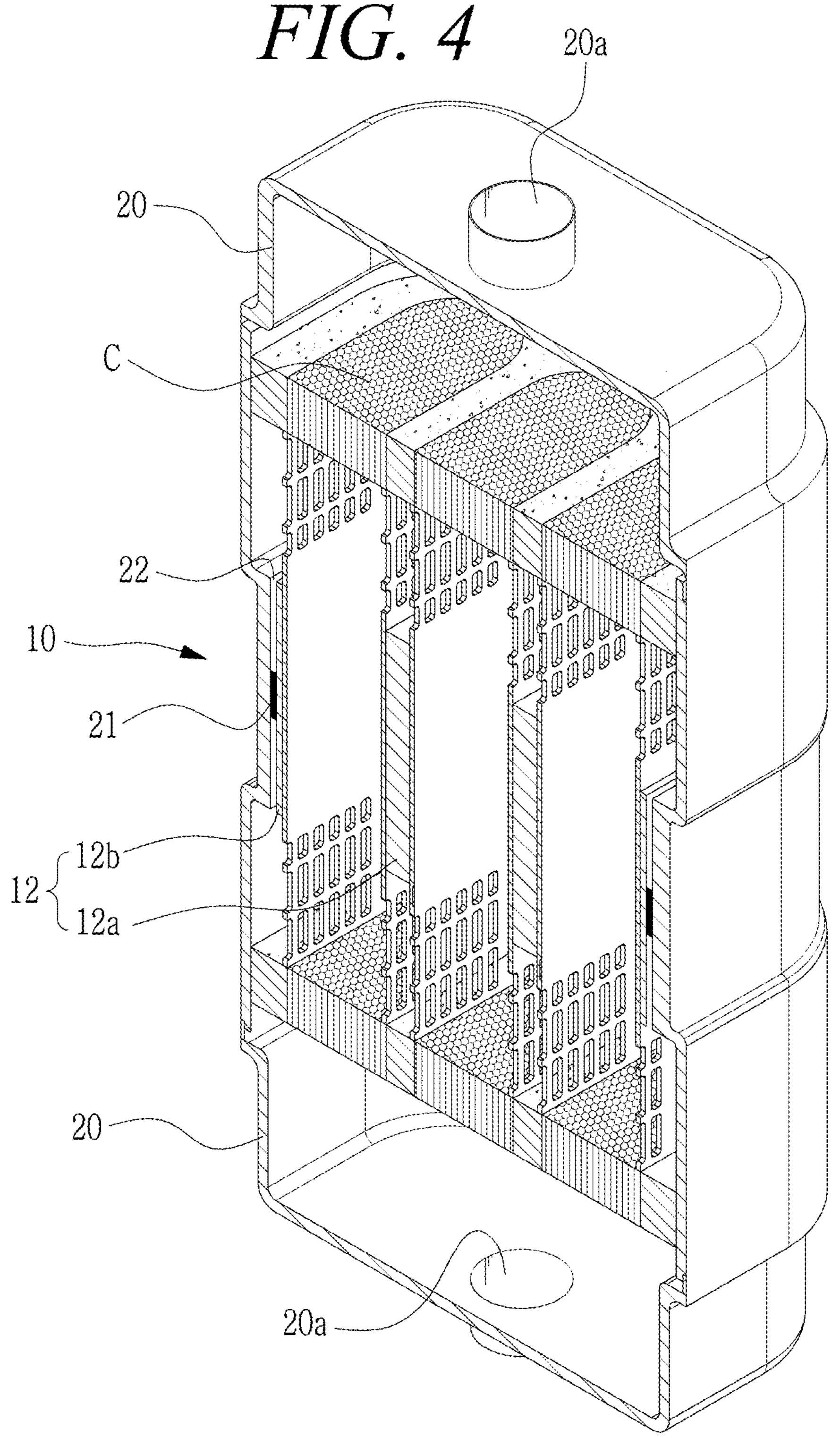
FIG. 4 is a view illustrating another fuel cell membrane humidifier according to the related art for solving the problems of the fuel cell membrane humidifier of the related art illustrated in FIG. 1.
Figure 5A:
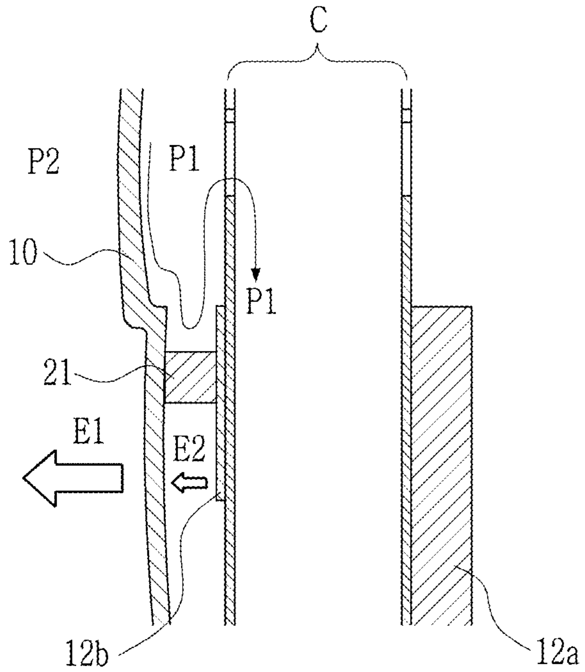
FIG. 5A and FIG. 5B are views illustrating problems of the other fuel cell membrane humidifier according to related art illustrated in FIG. 4.
Figure 5B:
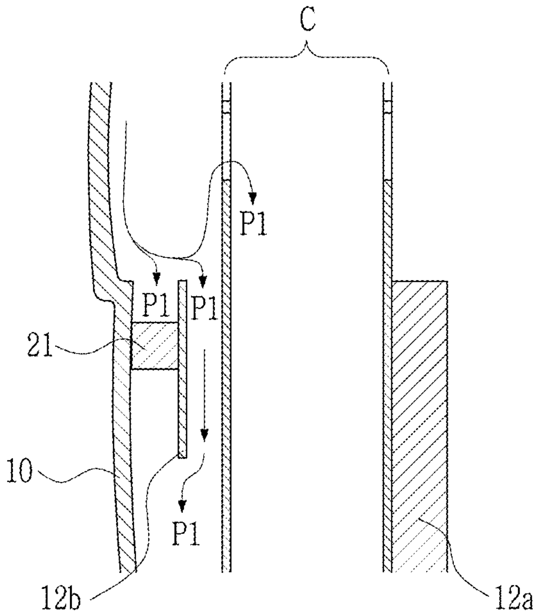
Prior Art FIG. 5B

The cap case 120 is coupled to both ends of the middle case 110. Fluid passages are formed in the respective cap cases 120, one of which becomes a first fluid inlet and the other one becomes a first fluid outlet. The first fluid flowing into the fluid passage 121 of the cap case 120 on one side passes through an inner duct of the hollow fiber membranes accommodated in the hollow fiber membrane cartridge (C, see FIG. 1), and then, exits through the fluid passage 121 of the cap case 120 on the other side. The hollow fiber membrane is, for example, a hollow fiber membrane of a Nafion, polyetherimide, polyphenylsulfone, polyimide (PI), polysulfone (PS), or polyethersulfone (PES) material.

A first mesh portion (M1, see FIG. 1) causing the second fluid flowing into the membrane humidifier through the second fluid inlet 111 to flow into the hollow fiber membrane cartridge is formed at one end of the hollow fiber membrane cartridge C, and a second mesh unit (M2, see FIG. 1) causing the second fluid that has performed moisture exchange inside the hollow fiber membrane cartridge to flow to the outside of the hollow fiber membrane cartridge may be formed at the other end. Both sides of the hollow fiber membrane cartridge C are inserted into a module insertion portion 210 by being put into partition walls 211 and 212 (see FIG. 10). Further, locking jaws (not illustrated) may be selectively formed on both the sides of the hollow fiber membrane cartridge, and when the hollow fiber membrane cartridge is inserted into the module insertion portion 210, the locking jaws may be put into the partitions walls 211 and 212 forming the module insertion portion 210.

Potting portions P that fill gaps between the hollow fiber membranes while binding the hollow fiber membranes are formed at both ends of the hollow fiber membrane cartridge or the hollow fiber membrane bundle. Thus, both ends of the hollow fiber membrane module are closed by the potting portions P, and a flow path through which the second fluid passes is formed therein. A material of the potting portion is well known, and detailed description thereof is omitted herein. A resin layer E with which a gap between the potting portion P and the middle case 110 is filled may be formed around the potting portion P, or a gasket assembly (not illustrated) that airtightly couples the potting portion P to the middle case 110 through mechanical assembly may be formed around the potting portion P.

Figure 10:
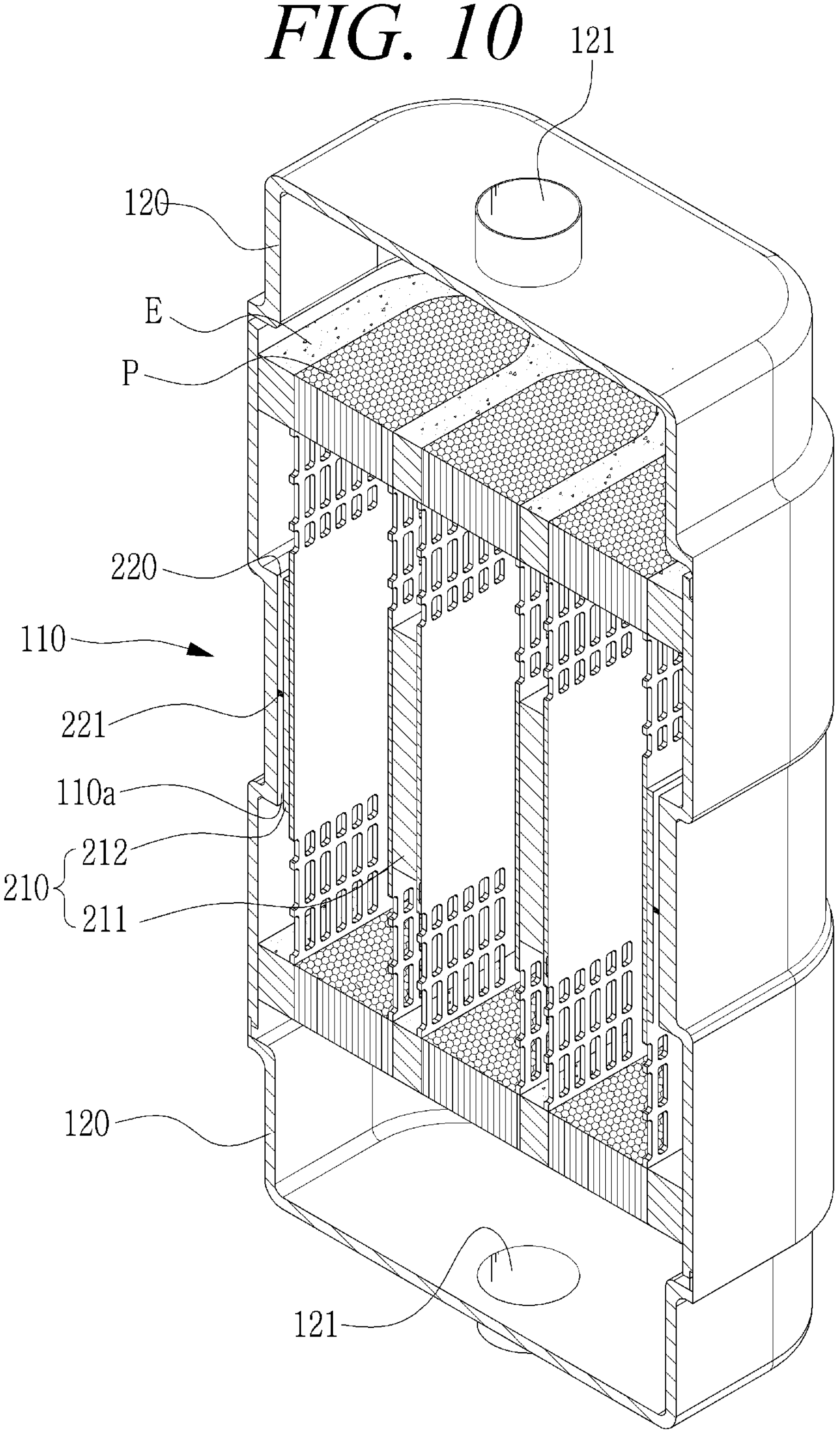
FIG. 10 is a cross-sectional view illustrating a portion of a middle case of the fuel cell membrane humidifier according to the embodiment of the present invention.

FIG. 10 is a cross-sectional view illustrating a portion of a middle case of the fuel cell membrane humidifier according to the embodiment of the present invention. As illustrated in FIG. 10, the module insertion portion 210 and an active pressure buffer portion 220 are formed inside the middle case 110.

The hollow fiber membrane cartridge C in which the plurality of hollow fiber membranes are accommodated is inserted into the module insertion portion 210. The module insertion portion 210 is made of a plurality of partition walls 211 and 212 so that the plurality of hollow fiber membrane cartridges C can be inserted. Meanwhile, when the hollow fiber membrane module F includes a single hollow fiber membrane cartridge, the inner partition wall 211 may be omitted. In this case, the module insertion portion 210 may be formed of only an outer partition wall 212.

An inner wall 110*a* of the middle case is formed to be spaced apart from the outer partition wall 212 of the module insertion portion 210. A space S created by the outer partition wall 212 and the inner wall 110*a* of the middle case being formed to be spaced apart from each other forms the active pressure buffer portion 220. The active pressure buffer portion 220 may further include a bypass structure 221 formed between the outer partition wall 212 and the inner wall 110*a* of the middle case.

The active pressure buffer portion 220 may be formed over a circumference of the outer partition wall 212. The active pressure buffer portion 220 isolates the fluid flow space A from the fluid flow space B so that the fluid flows only through the hollow fiber membrane cartridge C.

Further, the bypass structure 221, which is one component of the active pressure buffer portion 220, can prevent the outer partition wall 212 from expanding outward due to a pressure difference or eliminate the pressure difference to prevent the humidification efficiency from being degraded even when pressure (internal pressure P1) of the second fluid flowing into the inside through the fluid inlet 111 formed in the middle case 110 is much higher than atmospheric pressure (external pressure P2) outside the membrane humidifier due to a high output situation or an abnormal output situation of the fuel cell.

Figure 11:
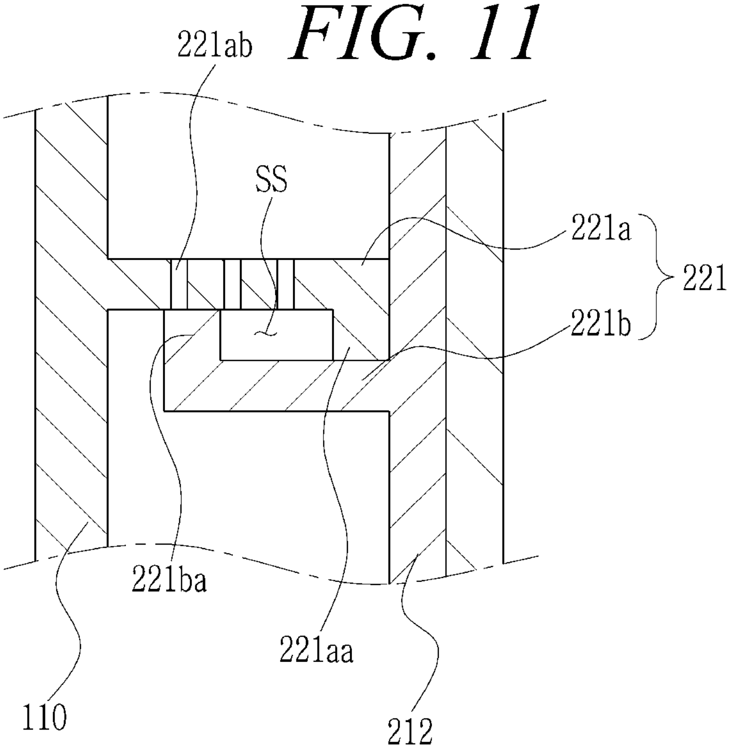
FIG. 11, FIG. 12, and FIG. 13 are enlarged cross-sectional views of change in state depending on expansion pressure of a bypass structure, which is a component of an active pressure buffer portion of the fuel cell membrane humidifier according to the embodiment of the present invention.
Figure 12:
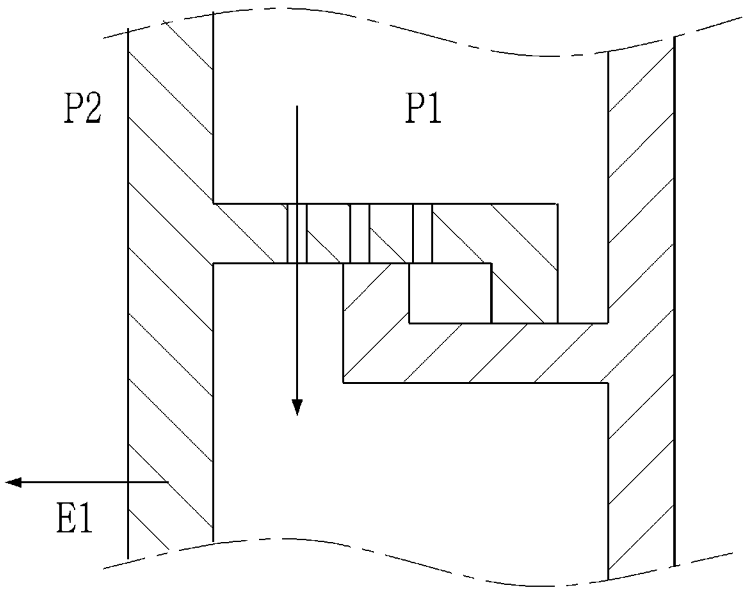
Figure 13:
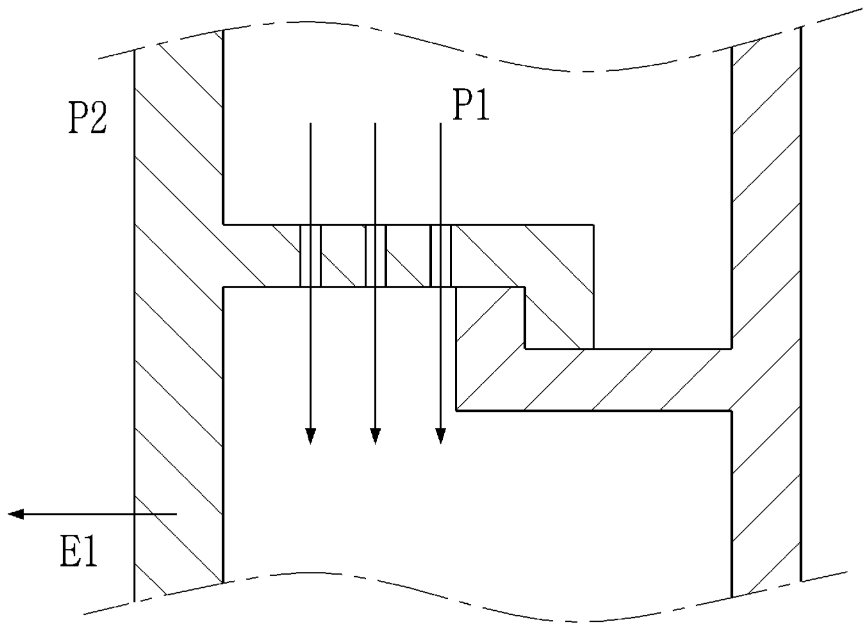

Hereinafter, the bypass structure 221 will be described with reference to FIG. 11, FIG. 12, and FIG. 13. FIG. 11, FIG. 12, and FIG. 13 are enlarged cross-sectional views of change in state depending on expansion pressure of the bypass structure 221, which is one component of the active pressure buffer portion 220.

As illustrated in FIG. 11, the bypass structure 221 includes a blocking members 221*a* and a connection member 221*b*. The blocking member 221*a* is formed on the inner wall 110*a* of the middle case 110 and formed to protrude in a direction of the outer partition wall and be spaced apart from the outer partition wall 212. The connection member 221*b* is formed to be fixed to the outer partition wall 212, protrude in a direction of the middle case 110, and be spaced apart from the inner wall 110*a* of the middle case 110. The blocking member 221*a* and the connection member 221*b* are coupled in a sliding manner.

A first sliding protrusions 221*ba* protruding in s direction of the blocking member 221*a* is formed at an end of the connection member 221*b* on the middle case 110 side, a second sliding protrusion 221*aa* protruding in a directions of the connection member 221*b* is formed at an end of the blocking member 221*a* on the outer partition wall 212 side, and a sliding space SS is formed between the two sliding protrusions 221*aa* and 221*ba*. An outward movement of the second sliding protrusion 221*aa* is limited by the first sliding protrusion 221*ba*.

The blocking member 221*a* includes at least one bypass hole 221*ab*. When the blocking member 221*a* moves along the sliding space SS due to expansion pressure between the outer partition wall 212 and the middle case 110, the bypass holes 221*ab* may be opened or closed.

For example, when the sliding space SS is relatively large because the expansion pressure between the outer partition wall 212 and the middle case 110 is not high, the bypass holes 221*ab* are closed by the connection member 221*b* (see FIG. 11). When the expansion pressure between the outer partition wall 212 and the middle case 110 gradually increases according to an output situation of the fuel cell, the blocking member 221*a* expands outward along with the middle case 110, and the bypass holes 221*ab* are opened (See FIGS. 12 and 13).

The pressure of the second fluid in the high output situation is relatively higher than that in the low output situation of the fuel cell. Further, the pressure of the second fluid in the abnormal output situation is relatively higher than that in the normal output situation of the fuel cell.

When the pressure of the second fluid is relatively higher in the high output situation or the abnormal output situation of the fuel cell, the middle case 110 receives the expansion pressure due to a large pressure difference and expands outward (indicated by E1). In this case, the blocking member 221*a* formed in the middle case 110 expands outward along with the middle case 110 (see FIG. 12)

When the high output situation or the abnormal output situation continues or further worsens, the pressure of the second fluid further increases, the blocking member 221*a* continues to expand outward, and the plurality of bypass holes 221*ab* closed by the connection member 221*b* are gradually opened one by one (see FIG. 13).

When the bypass hole 221*ab* is open as in FIG. 13, the fluid in the fluid flow space A flows into the fluid flow space B through the bypass hole 221*ab*, and then, is discharged through the second mesh portion M2 and the second fluid outlet 112, thereby eliminating the pressure of the fluid flowing in the fluid flow space A.

Thereafter, when the high output situation or the abnormal output situation is eliminated, that is, when the fuel cell returns to the low output situation or the normal output situation, the pressure of the second fluid becomes relatively lower, and thus, the expansion pressure gradually decreases and the blocking member 221*a* returns to the direction of the outer partition wall 212. Accordingly, the bypass hole 221*ab* is closed again, making it possible to prevent the fluid in the fluid flow space A from flowing through the fluid flow space B instead of flowing through the hollow fiber membrane module F. (see FIG. 11).

The active pressure buffer portion 220 configured as described above allows the pressure on both sides of the outer partition wall 212 to be maintained substantially the same even when the output situation of the fuel cell is an abnormal output situation in which abnormal pressure is generated. Since a pressure gradient is not formed on both the sides of the outer partition wall 212 due to the active pressure buffer portion 220, the outer partition wall 212 is not deformed.

Figure 14:
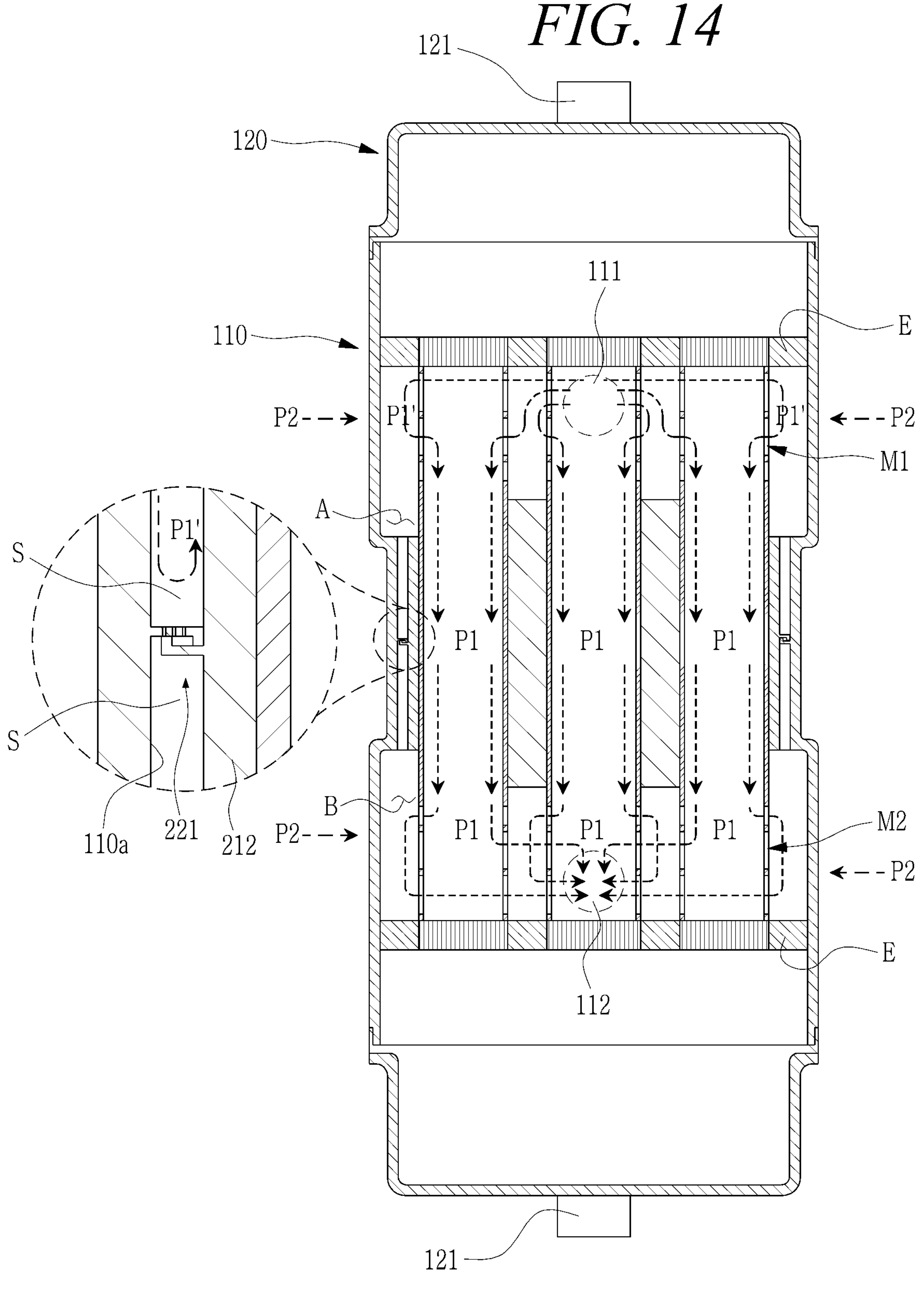
FIG. 14 is a cross-sectional view illustrating an operating state of the fuel cell membrane humidifier according to the embodiment of the present invention.

In connection thereto, referring to FIG. 14, the hollow fiber membrane cartridge C is disposed between the inner partition walls 211 and 212, and the second fluid discharged from the fuel cell stack (not illustrated) and flowing into the second fluid inlet 111 flows into the cartridge C through the first mesh portion M1, performs moisture exchange while flowing outside the hollow fiber membranes, and then, flows to the outside of the cartridge through the second mesh portion M2. In this case, since the pressure P1 of the fluid flowing through the hollow fiber membrane cartridge C is the same, the pressures on both the sides of the inner partition wall 211 are balanced so that no deformation occurs.

Meanwhile, in the outer partition wall 212, the second fluid at high pressure P1 flows through the hollow fiber membrane cartridge C on one side, and the second fluid at high pressure P1' that does not flow through the hollow fiber membrane cartridge C flows on the other side. Since the second fluids flowing through both the sides of the outer partition wall have substantially the same pressure (P1=P1'), the pressures on both the sides of the outer partition wall 212 are balanced so that no deformation occurs.

Meanwhile, when a pressure difference between the pressure P1 of the second fluid flowing through the active pressure buffer portion 220 and the atmospheric pressure P2 outside the middle case 110 is large in the high output situation or the abnormal output situation of the fuel cell, the blocking member 221*a* of the bypass structure 221 only expands outward together with the middle case 110, and the protrusion member 221*a* remains fixed to the outer partition wall 212. Thus, airtightness between the outer partition wall 212 and the hollow fiber membrane cartridge C is maintained, and the second fluid does not leak between the outer partition wall 212 and the hollow fiber membrane cartridge C.

Meanwhile, the second fluid flowing into the active pressure buffer portion 220 is turned in the bypass structure 221 and then, flows into the hollow fiber membrane cartridge C. Therefore, no gap is created between the hollow fiber membrane cartridge C and the outer partition wall 212 even in the high output situation or the abnormal output situation of the fuel cell unlike the related art, making it possible to prevent the fluid in the fluid flow space A from flowing through the fluid flow space B instead of flowing through the hollow fiber membrane module F, and as a result, to prevent the humidification efficiency from being degraded.

Further, when the high output situation or the abnormal output situation continues or further worsens, the pressure of the second fluid further increases so that the bypass holes 221*ab* formed in the blocking member 221*a* are open as openings thereof gradually increases (see FIG. 14). When the bypass hole 221*ab* are open, the fluid in the fluid flow space A flows into the fluid flow space B through the bypass hole 221*ab*, and then, is discharged through the second mesh portion M2 and the second fluid outlet 112, thereby eliminating the pressure of the fluid flowing in the fluid flow space A.

Although the embodiment of the present invention has been described above, those skilled in the art can variously modify or change the present invention through affixation, change, deletion, addition, or the like of components without departing from the spirit of the present invention described in the claims, and this will be said to be also included within the scope of the present invention.

DESCRIPTION OF CODE

110: middle case 120: cap case
210: module insertion portion 211: inner partition wall
212: outer partition wall 220: active pressure buffer portion
221: bypass structure 221*a*: blocking member
221*b*: connection member 221*aa*, 221*ba*: sliding protrusion
221*bb*: bypass hole SS: sliding space A, B: fluid flow space
C: hollow fiber membrane cartridge

The invention claimed is:

1. A fuel cell membrane humidifier comprising:

a middle case having a module insertion portion formed therein, the module insertion portion including an outer partition wall formed to be spaced apart from an inner wall of the middle case, a second fluid inlet through which a second fluid is supplied, and a second fluid outlet through which the second fluid is discharged;

a cap case coupled to the middle case and having a first fluid inlet through which a first fluid flows into an inside of the cap case and a first fluid outlet through which the first fluid is discharged;

a hollow fiber membrane module inserted into the module insertion portion and including at least one hollow fiber membrane bundle having a plurality of hollow fiber membranes integrated therein or at least one hollow fiber membrane cartridge having a plurality of hollow fiber membranes accommodated therein; and an active pressure buffer portion formed between the middle case and the module insertion portion to prevent the module insertion portion from expanding due to a pressure difference between an inside and an outside of the middle case or to eliminate the pressure difference, depending on an output situation of a fuel cell wherein the active pressure buffer portion includes a bypass structure formed between the outer partition wall and the inner wall of the middle case, wherein the bypass structure includes a connection member formed to be fixed to the outer partition wall, protruding toward the middle case, and be spaced apart from the inner wall of the middle case; and a blocking member formed on the inner wall of the middle case, protruding toward the outer partition wall, and coupled to the connection member in a sliding manner, wherein, when an end of the connection member protruding from the outer partition wall toward the middle case is referred to as a connection member protruding end, a first sliding protrusion is formed at the connection member protruding end by protruding toward the blocking member, wherein, when an end of the blocking member protruding from the inner wall of the middle case toward the outer partition wall is referred to as a blocking member protruding end, a second sliding protrusion is formed at the blocking member protruding end by protruding toward the connection member.

2. The fuel cell membrane humidifier of claim 1, wherein the blocking member includes bypass holes, the bypass holes being able to be opened or closed depending on a magnitude of expansion pressure between the outer partition wall and the middle case.

3. The fuel cell membrane humidifier of claim 2, wherein, when the expansion pressure gradually increases, the blocking member expands outward along with the middle case, and the bypass holes are opened.

* * * * *